(12) United States Patent
Zhang et al.

(10) Patent No.: US 11,409,523 B2
(45) Date of Patent: Aug. 9, 2022

(54) GRAPHICS PROCESSING UNIT

(71) Applicant: Shanghai Zhaoxin Semiconductor Co., Ltd., Shanghai (CN)

(72) Inventors: Wei Zhang, Shanghai (CN); Deming Gu, Shanghai (CN)

(73) Assignee: GLENFLY TECHNOLOGY CO., LTD., Shanghai (CN)

( * ) Notice: Subject to any disclaimer, the term of this patent is extended or adjusted under 35 U.S.C. 154(b) by 11 days.

(21) Appl. No.: 17/140,849

(22) Filed: Jan. 4, 2021

(65) Prior Publication Data
US 2022/0004385 A1    Jan. 6, 2022

(30) Foreign Application Priority Data
Jul. 6, 2020    (CN) .......................... 202010640113.3

(51) Int. Cl.
*G06F 9/30*    (2018.01)
*G06F 17/16*   (2006.01)
(Continued)

(52) U.S. Cl.
CPC ........ *G06F 9/3001* (2013.01); *G06F 9/30101* (2013.01); *G06F 9/48* (2013.01); *G06F 17/16* (2013.01); *G06T 1/20* (2013.01)

(58) Field of Classification Search
None
See application file for complete search history.

(56) References Cited

U.S. PATENT DOCUMENTS 5,267,185 A * 11/1993 Akabane ................. G06F 17/16
                                                                708/607
8,676,874 B2    3/2014 Fossum
(Continued)

FOREIGN PATENT DOCUMENTS

CA    3094841 A1 *  9/2018  .......... H03M 13/116
CN   208386519 U  *  1/2019  .......... G06F 11/1076
(Continued)

OTHER PUBLICATIONS

'SMASH: Co-designing Software Compression and Hardware-Accelerated Indexing for Efficient Sparse Matrix Operations' by Konstantinos Kanellopoulos et al., MICRO-52, Oct. 12-16, 2019. (Year: 2019).*

(Continued)

*Primary Examiner* — Steven G Snyder
(74) *Attorney, Agent, or Firm* — McClure, Qualey & Rodack, LLP

(57) ABSTRACT

A graphics processing unit includes a sparse matrix detection unit, a register file, an assertion register, and a matrix calculation unit. The sparse matrix detection unit reads a plurality of matrices from a storage device and determines whether the matrices are zero matrices or non-zero matrices to output a determination result. The register file stores the plurality of matrices from the sparse matrix detection unit. The assertion register marks up the matrices according to the determination result, and outputs a mark result. The matrix calculation unit receives a matrix calculation instruction, reads the non-zero matrices in the plurality of matrices from the register file according to the mark result, and calculates the non-zero matrices.

10 Claims, 3 Drawing Sheets

(51) Int. Cl.
*G06F 9/48* (2006.01)
*G06T 1/20* (2006.01)

(56) References Cited

U.S. PATENT DOCUMENTS

| | | | | |
|---|---|---|---|---|
| 9,396,164 | B2* | 7/2016 | Reinwald | G06F 17/16 |
| 10,565,207 | B2* | 2/2020 | Huang | H03M 7/3066 |
| 11,188,618 | B2* | 11/2021 | Maiyuran | G06F 9/30036 |
| 11,210,097 | B2 | 12/2021 | Zbiciak | |
| 11,269,638 | B2 | 3/2022 | Zbiciak et al. | |
| 2014/0108481 | A1* | 4/2014 | Davis | G06F 17/16 708/607 |
| 2018/0004709 | A1 | 1/2018 | Zhou | |
| 2018/0189234 | A1* | 7/2018 | Nurvitadhi | G06F 9/30036 |
| 2019/0205358 | A1* | 7/2019 | Diril | G06F 17/16 |
| 2019/0266217 | A1* | 8/2019 | Arakawa | G06F 7/462 |
| 2021/0073318 | A1* | 3/2021 | Maiyuran | G06F 13/1673 |
| 2021/0240684 | A1* | 8/2021 | Xiao | G06F 9/30018 |
| 2022/0058026 | A1* | 2/2022 | Valliappan | G10L 15/22 |

FOREIGN PATENT DOCUMENTS

| | | | |
|---|---|---|---|
| CN | 109740116 A | * | 5/2019 |
| TW | 201235865 A | | 9/2012 |

OTHER PUBLICATIONS

Khan Academy 'Intro to Zero Matrices' archived in Sep. 2019. (Year: 2019).*
University of Manitoba 'Math 1220 Linear Algebra—3.3 Scalar Multiplication' Archived on Sep. 8, 2019. (Year: 2019).*
TW Office Action dated Apr. 27, 2022 in Taiwan application No. 109132269.

* cited by examiner

GRAPHICS PROCESSING UNIT

CROSS REFERENCE TO RELATED APPLICATIONS

This application claims priority to and the benefit of China Application No. 202010640113.3, filed on Jul. 6, 2020, the entirety of which is incorporated by reference herein.

FIELD OF THE INVENTION

The invention relates to a graphics processing unit, especially one relating to a graphics processing unit with better matrix calculation capabilities.

DESCRIPTION OF THE RELATED ART

With the application and popularity of convolutional neural networks (CNN), various acceleration algorithms and corresponding hardware accelerator designs have emerged. The current popular hardware accelerator design solutions include: a graphics processing unit (GPU), an application specific integrated circuit (ASIC), and a field programmable gate array (FPGA). GPU has achieved the first-mover advantage in performing convolution neural network calculation with its own mature parallel computing hardware architecture and software applications.

The floating-point calculation unit within a traditional GPU can be used directly, or a new matrix calculation unit can be designed for acceleration. However, because the matrix calculation unit of a traditional GPU reads data directly from a register file, the read and write requirements for the register file are very high, so that more read and write conflicts may occur, which reduces the computing performance of the traditional GPU. Furthermore, the matrix calculation unit of the traditional GPU does not use the characteristics of many sparse matrices in the matrix calculation process for further acceleration, thereby increasing power consumption and increasing matrix calculation time.

BRIEF SUMMARY OF THE INVENTION

In order to resolve the issues described above, an embodiment of the invention provides a graphics processing unit. The graphics processing unit includes a sparse matrix detection unit, a register file, an assertion register, and a matrix calculation unit. The sparse matrix detection unit reads a plurality of matrices from a storage device, determines whether the matrices are zero matrices or non-zero matrices to output a determination result. The register file stores the matrices from the sparse matrix detection unit. The assertion register marks up the matrices according to the determination result, and outputs a mark result. The matrix calculation unit receives a matrix calculation instruction, reads the non-zero matrices of the matrices from the register file according to the mark result, and calculates the non-zero matrices.

According to the graphics processing unit disclosed above, further including a thread scheduling and instruction distribution unit and an integer calculation unit. The thread scheduling and instruction distribution unit sends an integer calculation instruction and the matrix calculation instruction. The integer calculation unit receives the integer calculation instruction and the matrix calculation instruction, executes an integer calculation according to the integer calculation instruction, and passes the matrix calculation instruction to the matrix calculation unit.

According to the graphics processing unit disclosed above, the matrix calculation unit includes a control unit, a plurality of calculation sub-units, and an accumulating unit. The matrix calculation unit reads the mark result of the matrices from the assertion register, and reads the non-zero matrices in the plurality of matrices from the resister file. The calculation sub-units calculate the non-zero matrices. The accumulating unit stores matrix sub-product values, and a matrix calculation result of the calculation sub-units during a matrix calculation. The matrix sub-product values are used by the calculation sub-units for the matrix calculation.

According to the graphics processing unit disclosed above, the matrix calculation unit ignores the zero matrices from the register file.

According to the graphics processing unit disclosed above, the control unit reads the matrix calculation result from the accumulating unit and writes the matrix calculation result into the register file when the matrix calculation is finished.

According to the graphics processing unit disclosed above, the assertion register uses one bit to mark the zero matrices and the non-zero matrices.

According to the graphics processing unit disclosed above, the assertion register marks the zero matrices as "0", and marks the non-zero matrices as "1".

An embodiment of the invention also provides a method for accelerating a matrix calculation, which is applicable to a graphics processing unit. The method includes: receiving a matrix calculation instruction; reading a plurality of matrices from a storage device, and determining whether the matrices are zero matrices or non-zero matrices to output a determination result; marking up the matrices according to the determination result, and outputting a mark result; and reading the non-zero matrices according to the mark result, and calculating the non-zero matrices.

The method disclosed above further includes ignoring the zero matrices according to the mark result.

According to the method disclosed above, marking up the matrices according to the determination result includes using one bit to mark the zero matrices and the non-zero matrices.

According to the method disclosed above, using one bit to mark the zero matrices and the non-zero matrices includes marking the zero matrices as "0", and marking the non-zero matrices as "1".

BRIEF DESCRIPTION OF THE DRAWINGS

The invention can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration.

DETAILED DESCRIPTION OF THE INVENTION

Figure 1:
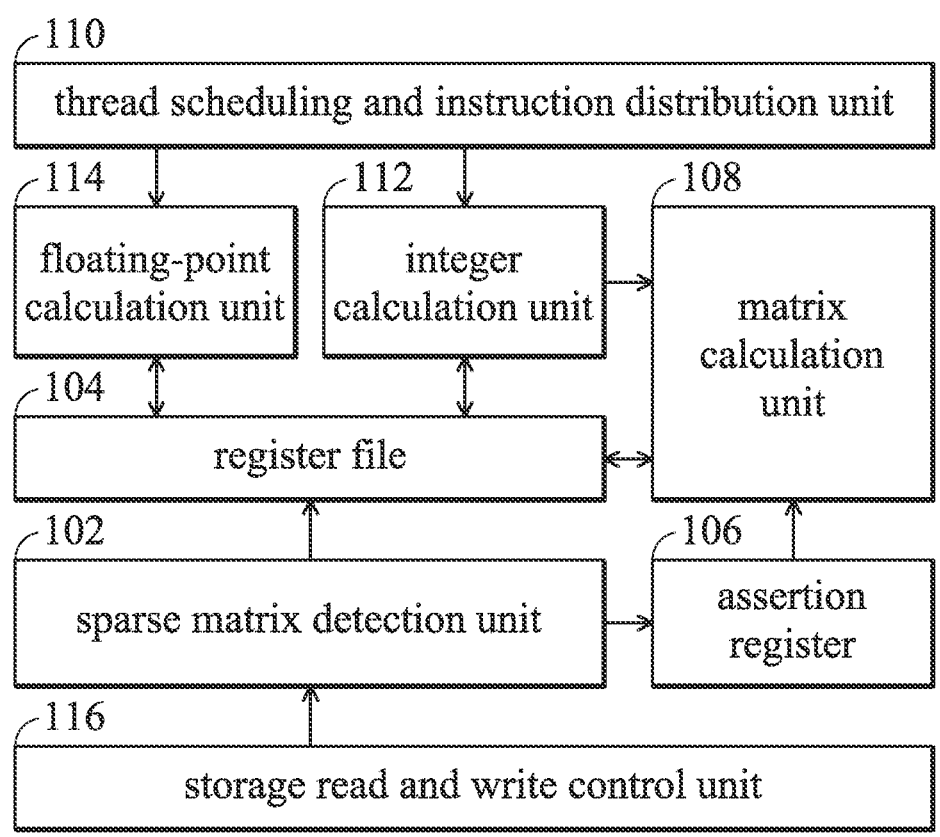
FIG. 1 is a schematic diagram of a graphics processing unit in accordance with some embodiments of the disclosure.

FIG. 1 is a schematic diagram of a graphics processing unit 100 in accordance with some embodiments of the disclosure. As shown in FIG. 1, the graphics processing unit 100 includes a sparse matrix detection unit 102, a register file 104, an assertion register 106, a matrix calculation unit 108, a thread scheduling and instruction distribution unit 110, an integer calculation unit 112, a floating-point calculation unit 114, and a storage device read and write control unit 116. When the graphics processing unit 100 receives a matrix calculation instruction, the sparse matrix detection unit 102 reads a plurality of matrices from a storage device (not shown) through the storage read and write control unit 116. In some embodiments, the graphics processing unit 100 may be included in an electronic device, such as a laptop, a desktop computer, a smart mobile device, a tablet, and a work station server, etc. The electronic device may include another processor (such as a central processing unit (CPU)) to accordingly sends instructions (such as a matrix calculation instruction) to the graphics processing unit 100 according to operations of users. In some embodiments, the storage is a non-volatile memory, such as a flash memory.

The sparse matrix detection unit 102 determines whether each of the matrices is a zero matrix or a non-zero matrix to output a determination result to the assertion register 106. In some embodiments, the zero matrix refers to a matrix in which all elements in the matrix are 0, and the non-zero matrix refers to a matrix in which all elements in the matrix are not 0 or partially 0. In some embodiments, the sparse matrix detection unit 102, the register file 104, the assertion register 106, the matrix calculation unit 108, the thread scheduling and instruction distribution unit 110, the integer calculation unit 112, the floating-point calculation unit 114, and the storage read and write control unit 116 are generated by the graphics processing unit 100 respectively executing the corresponding function codes. For example, the sparse matrix detection unit 102 is generated by the graphics processing unit 100 executing a code which is able to detect zero matrices. For example, the code can have the function of an OR gate in digital logics. All elements in the matrix and 0 are input into the OR gate. If OR calculation results between at least one element in the matrix and 0 are not 0, the sparse matrix detection unit 102 determines the matrix is a non-zero matrix. In contrast, if OR calculation results between all elements in the matrix and 0 are all 0, the sparse matrix detection unit 102 determines the matrix is a zero matrix.

The register file 104 directly stores the matrices required in a matrix calculation from the sparse matrix detection unit 102, or indirectly stores the matrices required in the matrix calculation from the memory through the sparse matrix detection unit 102. In some embodiments, the register file 104 is a cache memory to pre-store the matrices required to use in the matrix calculation. The assertion register 106 marks the matrices according to the determination result to output a mark result to the matrix calculation unit 108. In some embodiments, the assertion register 106 uses one bit to mark the zero matrices and the non-zero matrices. For example, in some embodiments, the assertion register 106 marks the zero matrices as "0", and marks the non-zero matrices as "1", but the present invention is not limited thereto. In some embodiments, the assertion register 106 can be generated, for example, by the graphics processing unit 100 in FIG. 1 executing an if-else conditional expression. For example, when a matrix in the sparse matrix detection unit 102 meets a first condition (for example, the matrix is a zero matrix), the assertion register 106 marks the matrix as "0". When a matrix in the sparse matrix detection unit 102 meets a second condition (for example, the matrix is a non-zero matrix), the assertion register 106 marks the matrix as "1". The matrix calculation unit 108 receives the matrix calculation instruction, reads the non-zero matrices from the register file 104 according to the mark result of the assertion register 106, and performs matrix calculations on the non-zero matrices.

Table 1 is processing results of the sparse matrix detection unit 102, the assertion register 106, and the matrix calculation unit 108 on matrices 1~5.

TABLE 1

| matrix | | a determination result of the sparse matrix detection unit 102 | a mark result of the assertion register 106 | matrix calculation of the matrix calculation unit 108 |
|---|---|---|---|---|
| 1 | $\begin{bmatrix} 0 & 0 & 0 & 0 \\ 0 & 0 & 0 & 0 \\ 0 & 0 & 0 & 0 \\ 0 & 0 & 0 & 0 \end{bmatrix}$ | zero matrix | 0 | no calculations |
| 2 | $\begin{bmatrix} 0 & 0 & 0 & 0 \\ 0 & 0 & 5 & 0 \\ 0 & 2 & 0 & 0 \\ 0 & 0 & 0 & 0 \end{bmatrix}$ | non-zero matrix | 1 | calculate |
| 3 | $\begin{bmatrix} 7 & 3 & 5 & 1 \\ 2 & 0 & 22 & 6 \\ 4 & 3 & 0 & 8 \\ 5 & 11 & 0 & 10 \end{bmatrix}$ | non-zero matrix | 1 | calculate |
| 4 | $\begin{bmatrix} 0 & 0 & 0 & 0 \\ 0 & 0 & 0 & 0 \\ 0 & 0 & 0 & 0 \\ 0 & 0 & 0 & 0 \end{bmatrix}$ | zero matrix | 0 | no calculations |
| 5 | $\begin{bmatrix} 6 & 4 & 4 & 16 \\ 5 & 8 & 10 & 3 \\ 17 & 20 & 2 & 35 \\ 1 & 7 & 8 & 6 \end{bmatrix}$ | non-zero matrix | 1 | calculate |

In some embodiments, the matrices 1~5 are stored in the storage. After the graphics processing unit 100 receives the matrix calculation instruction (such as the matrix calculation on the matrices 1~5), the storage read and write control unit 116 reads the matrices 1~5 from the storage, and the sparse matrix detection unit 102 stores the matrices 1~5 into the register file 104. As shown in Table 1, all elements in the matrices 1 and 4 are 0, thus the sparse matrix detection unit 102 determines the matrices 1 and 4 are zero matrices, and the assertion register 106 marks the matrices 1 and 4 as "0". Because the matrices 1 and 4 are marked as "0", the matrix calculation unit 108 does not select the matrices 1 and 4, and directly ignores the matrices 1 and 4 in the matrix calculation. The matrices 2, 3, and 5 all have at least one non-zero element, thus the sparse matrix detection unit 102 determines the matrices 2, 3, and 5 are non-zero matrices, and the assertion register 106 marks the matrices 2, 3, and 5 as "1". Because the matrices 2, 3, and 5 are marked as "1", the matrix calculation unit 108 selects the matrices 2, 3, and 5 for the matrix calculation. The matrices 1~5 in Table 1 are only examples, the present invention is not limited thereto. The person skilled in the art understands that the matrices used in the matrix calculation of convolutional neural network (CNN) are all giant matrices (which contain thousands to tens of thousands of elements), thus the examples of the matrices 1~5 are for the convenience of explaining the processing operations of the sparse matrix detection unit 102, the assertion register 106, and the matrix calculation unit 108 in the graphics processing unit 100 of the present invention. Because the CNN has the characteristics of sparsity, in other words, the matrices used in the matrix calculation of the CNN have many zero matrices, the graphics processing unit 100 of the present invention can filter out the zero matrices in the matrix calculation through the sparse matrix detection unit 102, the assertion register 106, and the matrix calculation unit 108 to improve the efficiency of the matrix calculation.

In FIG. 1, the thread scheduling and instruction distribution unit 110 selects a thread to be processed from a plurality of threads, fetches the corresponding instructions, and sends the corresponding instructions to the integer calculation unit 112 and the floating-point calculation unit 114. For example, the thread scheduling and instruction distribution unit 110 sends a floating-point calculation instruction in the threads to be processed to the floating-point calculation unit 114, and sends an integer calculation instruction and a matrix calculation instruction to the integer calculation unit 112. The integer calculation unit 112 performs the corresponding integer calculation according to the integer calculation instruction. The floating-point calculation unit 114 performs the corresponding floating-point calculation according to the floating-point calculation instruction. In some embodiments, the integer calculation unit 112 and the floating-point calculation unit 114 are used to perform calculations other than the matrix calculation (such as a matrix multiplication), such as address calculations, and ordinary (non-matrix) multiplication and addition calculations. In some embodiments, the thread scheduling and instruction distribution unit 110 combines the integer calculation instruction and the matrix calculation instruction into an instruction set, and sends the instruction set to the integer calculation unit 112. The integer calculation unit 112 reads the integer calculation instruction from the instruction set, and passes the matrix calculation instruction in the instruction set to the matrix calculation unit 108. In some embodiments, a first address section of the instruction set is the integer calculation instruction, and a second address section of the instruction set is the matrix calculation instruction. The integer calculation unit 112 only reads the integer calculation instruction in the first address section of the instruction set, and passes the instruction set to the matrix calculation unit 108. Then, the matrix calculation unit 108 reads the matrix calculation instruction in the second address section of the instruction set.

Figure 2:
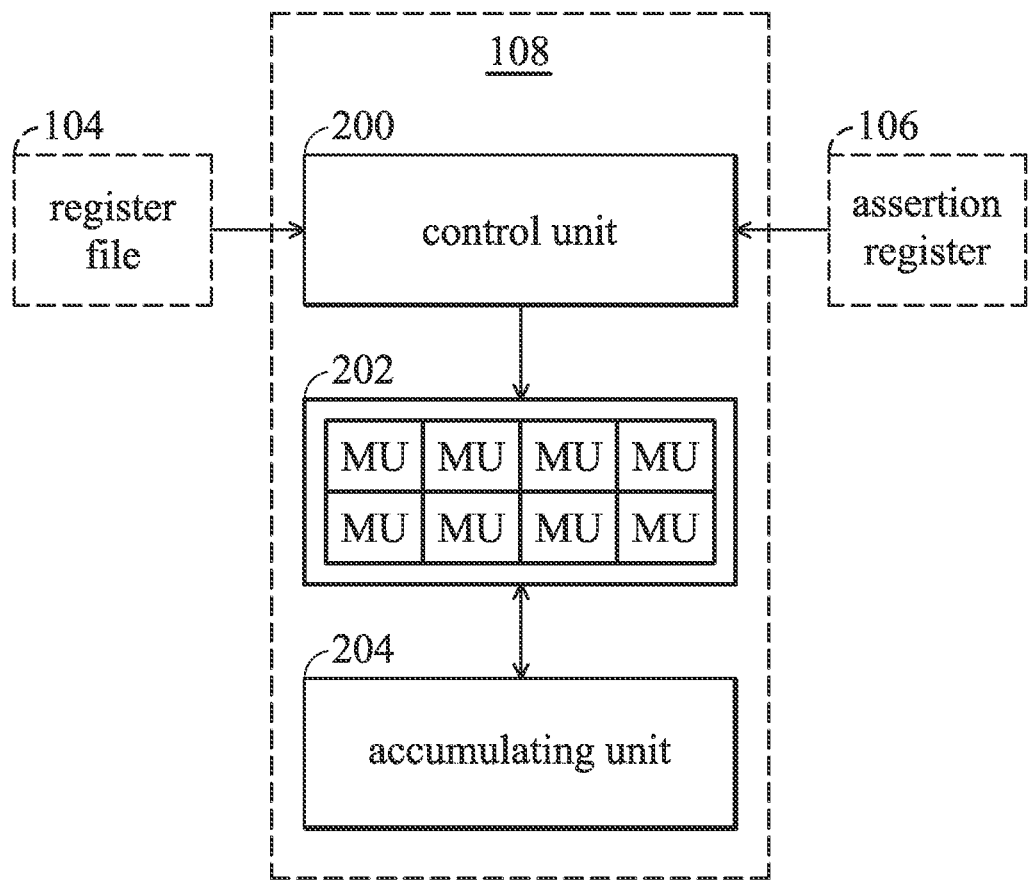
FIG. 2 is a schematic diagram of an operation of a matrix calculation unit in accordance with some embodiments of the disclosure.

FIG. 2 is a schematic diagram of an operation of the matrix calculation unit 108 in accordance with some embodiments of the disclosure. As shown in FIG. 2, the matrix calculation unit 108 includes a control unit 200, a plurality of calculation sub-units 202, and an accumulating unit 204. After the matrix calculation unit 108 receives the matrix calculation instruction from the integer calculation unit 112, the control unit 200 of the matrix calculation unit 108 reads the mark result (such as the mark result of the assertion register 106 in FIG. 1, that is, "0" or "1") of the matrices (such as the matrices 1~5 in Table 1), and reads the non-zero matrices (such as the matrices 2, 3 and 5 in Table 1) in the matrices from the register file 104. After that, the calculation sub-units 202 of the matrix calculation unit 108 perform matrix calculations on the non-zero matrices, and ignore the zero matrices. The accumulating unit 204 of the matrix calculation unit 108 stores matrix sub-product values and a matrix calculation result of the calculation sub-units 202 during the matrix calculation. The matrix sub-product values are used by the calculation sub-units 202 for the matrix calculation.

For example, when one of the calculation sub-units 202 performs matrix multiplication on the matrices 2 and 3 in Table 1, the calculation sub-unit 202 may store the multiplication result of the first column of the matrix 2 and the first row of the matrix 3 (that is, the sub-product value when the matrices 2 and 3 are multiplied) in the accumulating unit 204. Moreover, after finishing the matrix multiplication calculation for each column and each row of the matrices 2 and 3, the accumulating unit 204 combines all the sub-product values when matrices 2 and 3 are multiplied to correspondingly obtain a matrix calculation result (that is, get all element values of a 4×4 matrix obtained by multiplying the matrix 2 by the matrix 3). In some embodiments, the control unit 200 of the matrix calculation unit 108 reads the matrix calculation result from the accumulating unit 204, and writes the matrix calculation result into the register file 104 to finish a complete matrix calculation.

In some embodiments, the control unit 200 of the matrix calculation unit 108 is generated by the graphics processing unit 100 in FIG. 1 executing an access code to read the mark result of the matrices from the assertion register 106, and to write the matrix calculation result stored in the accumulating unit 204 into the register file 104. In some embodiments, the control unit 200 includes a controller (not shown) and a register (not shown). The controller can execute an independent access code to read the mark result of the matrices from the assertion register 106, and store the mark result in the register of the control unit 200. After that, the matrix calculation result stored in the register file 104 is provided to the floating-point calculation unit 114 for subsequent processing. In some embodiments, the graphics processing unit 100 of the present invention increases the matching of the matrix calculation unit 108 and the floating-point calculation unit 114. For example, in the calculation process, the floating-point calculation unit 114 may have a greater chance to read the matrix calculation result of the matrix calculation unit 108 stored in the register file 104, and may perform more in-depth non-matrix calculations on the matrix calculation result, so that the present invention makes full use of the powerful computing capability of the floating-point calculation unit 114. In some embodiments, the calculation sub-units 202 and the accumulating unit 204 of the matrix calculation unit 108 are generated by the graphics processing unit 100 in FIG. 1 by executing a matrix multiplication algorithm to obtain the matrix calculation result after the matrix multiplication. In some embodiments, the calculation sub-units 202 takes 8 calculation sub-units as an example, but the present invention is not limited thereto.

Figure 3:
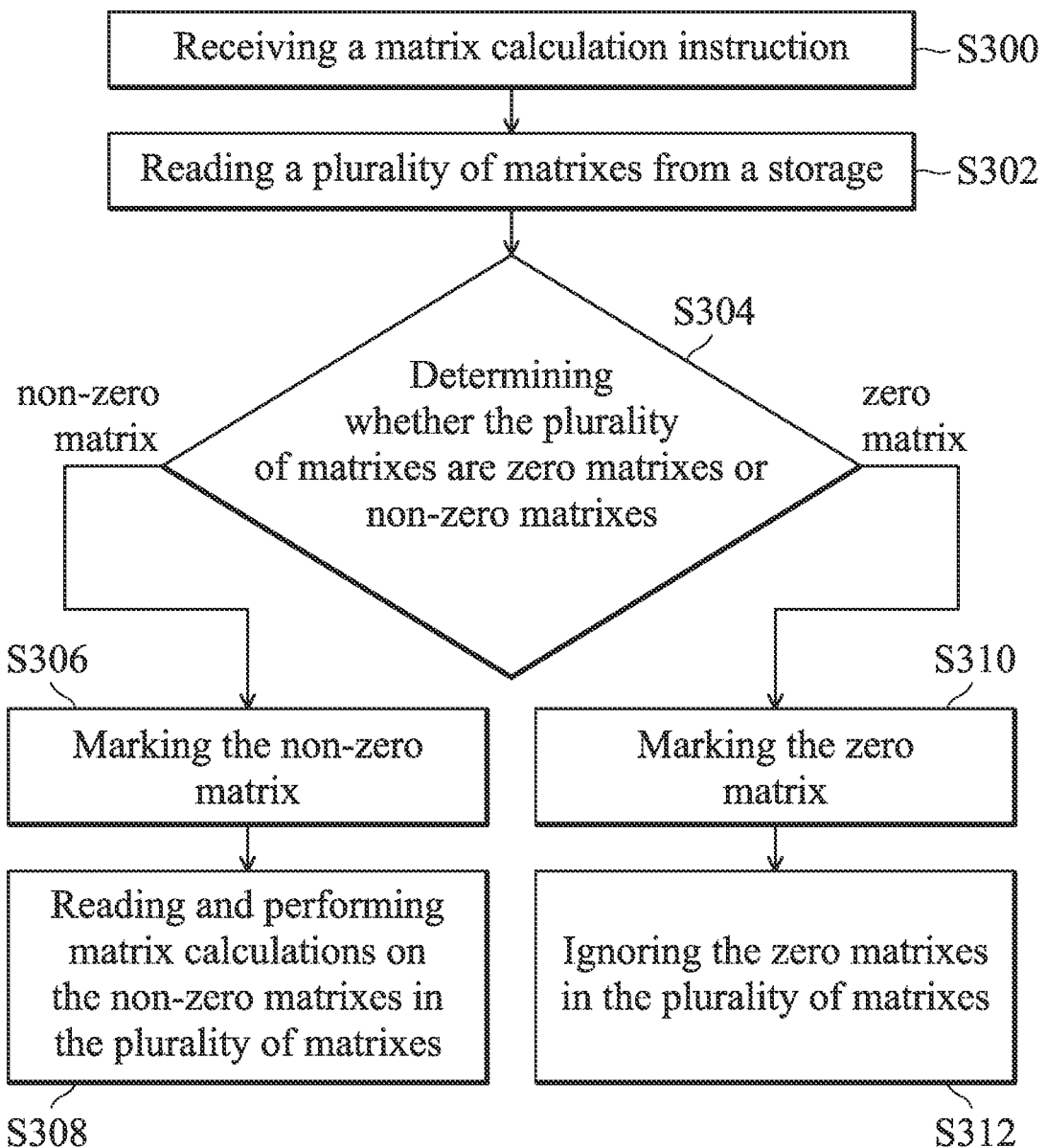
FIG. 3 is a flow chart of a method for accelerating a graphics processing unit in accordance with some embodiments of the disclosure.

The present invention also discloses a method for accelerating matrix calculations, which is suitable for a graphics processing unit (GPU). FIG. 3 is a flow chart of a method for accelerating a graphics processing unit in accordance with some embodiments of the disclosure. The method for accelerating matrix calculations includes: receiving a matrix calculation instruction (step S300); reading a plurality of matrices from a storage device according to the matrix calculation instruction (step S302); determining whether the matrices are zero matrices or non-zero matrices (step S304). In step S304, when the matrices are non-zero matrices, the method continues to execute step S306. In step S306, the method of the present invention marks the non-zero matrices. Then, in step S308, the method of the present invention reads and performs matrix calculations on the non-zero matrices. In step S304, when the matrices are zero matrices, the method continues to perform step S310. In step S310, the method of the present invention marks the zero matrices. Then, in step S312, the method of the present invention directly ignores the zero matrices, and does not perform matrix calculations on the zero matrices.

In some embodiments, step S300 is executed by the thread scheduling and instruction distribution unit 110 of the graphics processing unit 100 in FIG. 1. In more detail, when the thread scheduling and instruction distribution unit 110 receives a matrix calculation instruction from another processor (such as a central processing unit (CPU)), the thread scheduling and instruction distribution unit 110 combines the matrix calculation instruction with an integer calculation instruction, and sends them both to the integer calculation unit 112 at the same time. The integer calculation unit 112 passes the matrix calculation instruction to the matrix calculation unit 108. Step S302 is executed by the sparse matrix detection unit 102 of the graphics processing unit 100 in FIG. 1. In more detail, when the graphics processing unit 100 receives the matrix calculation instruction, the storage read and write control unit 116 reads a plurality of matrices required for the matrix calculation instruction from a storage device, and sends the matrices to the sparse matrix detection unit 102. Then, step S304 is executed by the sparse matrix detection unit 102 of the graphics processing unit 100 in FIG. 1. When the sparse matrix detection unit 102 determines the matrices are non-zero matrices, step S306 is executed by the assertion register 106 of the graphics processing unit 100 in FIG. 1, and step S308 is executed by the matrix calculation unit 108. In more detail, the control unit 200 of the matrix calculation unit 108 selects the non-zero matrices according to the mark result of the assertion register 106, and sends the non-zero matrices to the calculation sub-units 202, so that the calculation sub-units 202 and the accumulating unit 204 can perform matrix calculations on the non-zero matrices. When the sparse matrix detection unit 102 determines the matrices are zero matrices, step S310 is executed by the assertion register 106 of the graphics processing unit 100 in FIG. 1, and step S312 is executed by the matrix calculation unit 108. In more detail, the control unit 200 of the matrix calculation unit 108 ignores the zero matrices according to the mark result of the assertion register 106, and does not send the zero matrices to the calculation sub-units 202 for calculating.

The graphics processing unit 100 and the acceleration method of the graphics processing unit disclosed in the present invention increase the computing capability of the matrix calculation unit 108 of the graphics processing unit 100, reduce the number of data accesses between the matrix calculation unit 108 and the register file 104, and also increase the processing capability of the matrix calculation unit 108 for sparse matrices, so as to improve performance and reduce power consumption. The graphics processing unit 100 and the acceleration method of the graphics processing unit disclosed in the present invention fully consider the sparsity and nonlinearity of matrices in the matrix calculation of the CNN, and add the sparse matrix detection unit 102 in FIG. 1 and the control unit 200 in the matrix calculation unit 108 in FIG. 2. Since the matrix calculation of zero matrices are ignored, the graphics processing unit 100 reduces the amount of calculation by 20% in the matrix calculation process, thereby making the graphics processing unit 100 more efficient in acceleration and lower power consumption.

In conclusion, the advantages of the graphics processing unit of the present invention are listed below. First, a more efficient matrix calculation unit (for example, the matrix calculation unit 108) is added to a single core of the graphics processing unit. Second, in order to reduce the reading and writing load of the register file 104, the present invention adds an accumulating unit to the matrix calculation unit 108 to store intermediate data in the matrix calculation process. Third, in order to make full use of the sparsity of the CNN, the present invention adds the sparse matrix detection unit 102, and uses the existing assertion register 106 to store relevant information, and the control unit 200 in the matrix calculation unit 108 directly skips the matrix calculation of the zero matrices according to the relevant information stored in the assertion register 106.

The ordinals in the specification and the claims of the present invention, such as "first", "second", "third", etc., have no sequential relationship, and are just for distinguishing between two different components with the same name. In the specification of the present invention, the word "couple" refers to any kind of direct or indirect electronic connection. The present invention is disclosed in the preferred embodiments as described above, however, the breadth and scope of the present invention should not be limited by any of the embodiments described above. Persons skilled in the art can make small changes and retouches without departing from the spirit and scope of the invention. The scope of the invention should be defined in accordance with the following claims and their equivalents.

What is claimed is:

1. A graphics processing unit, comprising:
   a sparse matrix detection unit reading a plurality of matrices in a storage device, determining whether the plurality of matrices are zero matrices or non-zero matrices to output a determination result;
   a register file storing the plurality of matrices from the sparse matrix detection unit;
   an assertion register marking the plurality of matrices according to the determination result and outputting a mark result;
   a matrix calculation unit receiving a matrix calculation instruction, reading the non-zero matrices in the plurality of matrices from the register file according to the mark result, and performing matrix calculations on the non-zero matrices;
   a thread scheduling and instruction distribution unit sending an integer calculation instruction and the matrix calculation instruction; and
   an integer calculation unit receiving the integer calculation instruction and the matrix calculation instruction;
   wherein the integer calculation unit executes an integer calculation according to the integer calculation instruction and passes the matrix calculation instruction to the matrix calculation unit.

2. The graphics processing unit as claimed in claim 1, wherein the matrix calculation unit comprises:
   a control unit reading the mark result of the plurality of matrices from the assertion register and reading the non-zero matrices in the plurality of matrices from the resister file according to the mark result;
   a plurality of calculation sub-units performing matrix calculations on the non-zero matrices;
   an accumulating unit storing matrix sub-product values and a matrix calculation result of the plurality of calculation sub-units during a matrix calculation; wherein the matrix sub-product values are used by the plurality of calculation sub-units for the matrix calculation.

3. The graphics processing unit as claimed in claim 1, wherein the matrix calculation unit ignores the zero matrices in the plurality of matrices from the register file according to the mark result.

4. The graphics processing unit as claimed in claim 2, wherein the control unit reads the matrix calculation result from the accumulating unit and writes the matrix calculation result into the register file when the matrix calculation is finished.

5. The graphics processing unit as claimed in claim 1, wherein the assertion register uses one bit to mark the zero matrices and the non-zero matrices in the plurality of matrices.

6. The graphics processing unit as claimed in claim 5, wherein the assertion register marks the zero matrices in the plurality of matrices as "0" and marks the non-zero matrices in the plurality of matrices as "1".

7. A method for accelerating a matrix calculation, applicable to a graphics processing unit, comprising:
receiving a matrix calculation instruction;
reading a plurality of matrices from a storage device and determining whether the plurality of matrices are zero matrices or non-zero matrices to output a determination result;
marking the plurality of matrices according to the determination result and outputting a mark result;
reading the non-zero matrices in the plurality of matrices according to the mark result and performing matrix calculations on the non-zero matrices;
receiving an integer calculation instruction;
executing an integer calculation according to the integer calculation instruction and
passing the matrix calculation instruction, so that the matrix calculations on the non-zero matrices are performed.

8. The method as claimed in claim 7, further comprising:
ignoring the zero matrices in the plurality of matrices according to the mark result.

9. The method as claimed in claim 7, wherein marking the plurality of matrices according to the determination result comprises:
using one bit to mark the zero matrices and the non-zero matrices in the plurality of matrices.

10. The method as claimed in claim 9, wherein using one bit to mark the zero matrices and the non-zero matrices in the plurality of matrices comprises:
marking the zero matrices in the plurality of matrices as "0" and marking the non-zero matrices in the plurality of matrices as "1".

* * * * *